US012780752B2

(12) United States Patent
Ward et al.

(10) Patent No.: US 12,780,752 B2
(45) Date of Patent: Nov. 3, 2026

(54) AQUEOUS COMPOSITION COMPRISING PHOSPHORIC ACID AND BORIC ACID

(71) Applicant: Yara UK Limited, York (GB)

(72) Inventors: Stuart Ward, York (GB); Jonathan Brown, York (GB)

(73) Assignee: YARA UK LIMITED, York (GB)

( * ) Notice: Subject to any disclaimer, the term of this patent is extended or adjusted under 35 U.S.C. 154(b) by 459 days.

(21) Appl. No.: 18/561,976

(22) PCT Filed: May 25, 2022

(86) PCT No.: PCT/GB2022/051312

§ 371 (c)(1),
(2) Date: Nov. 17, 2023

(87) PCT Pub. No.: WO2022/248853

PCT Pub. Date: Dec. 1, 2022

(65) Prior Publication Data

US 2024/0246873 A1 Jul. 25, 2024

(30) Foreign Application Priority Data

May 27, 2021 (GB) ..................................... 2107588

(51) Int. Cl.

| | |
|---|---|
| ***C05B 17/00*** | (2006.01) |
| ***C05D 9/02*** | (2006.01) |
| ***C05G 1/00*** | (2006.01) |
| ***C05G 3/40*** | (2020.01) |

(52) U.S. Cl.
CPC ................ *C05B 17/00* (2013.01); *C05D 9/02* (2013.01); *C05G 1/00* (2013.01); *C05G 3/44* (2020.02)

(58) Field of Classification Search
CPC .. C05B 17/00; C05G 3/44; C05G 1/00; C05D 9/02
See application file for complete search history.

(56) References Cited

U.S. PATENT DOCUMENTS

| | | | | |
|---|---|---|---|---|
| 2006/0084573 A1* | 4/2006 | Grech | .................... A01N 45/00 504/101 |
| 2019/0161418 A1* | 5/2019 | Meredith | ................. C05D 9/02 |

FOREIGN PATENT DOCUMENTS

| | | | | |
|---|---|---|---|---|
| CN | 102311289 | | 1/2012 | |
| CN | 102311289 A | * | 1/2012 | ............... C05G 3/00 |
| CN | 102659467 | | 9/2012 | |
| CN | 102311289 B | | 4/2014 | |
| CN | 104446761 A | | 3/2015 | |
| CN | 104892322 A | * | 9/2015 | ............... C05G 3/80 |
| CN | 105152810 A | | 12/2015 | |
| CN | 106748256 A | | 5/2017 | |
| CN | 107827585 A | | 3/2018 | |
| CN | 108546177 | | 9/2018 | |

OTHER PUBLICATIONS

Combined Search and Examination Report issued in GB2107588, dated Nov. 26, 2021, 11 pages.
International Search Report and Written Opinion issued in App. No. PCT/GB2022/051312, mailing date Sep. 12, 2022, 16 pages.

* cited by examiner

*Primary Examiner* — Wayne A Langel
(74) *Attorney, Agent, or Firm* — DILWORTH IP, LLC

(57) ABSTRACT

A method for preparing an aqueous composition, comprising the steps of: a) dissolving boric acid in a solvent including a compound selected from the group consisting of glycerol, glycols, glycol derivatives, and any mixtures thereof; and b) mixing the boric acid solution obtained in step a) with an aqueous solution including from 1.0 to 50 weight % of phosphoric acid. The present application also provides an aqueous composition including water, from 1.0 to 50 weight % of phosphoric acid from 0.5 to 5.0 wt % of boric acid, and from 2.0 to 20 wt % of a compound selected from the group consisting of glycerol, glycols, glycol derivatives, and any mixtures thereof.

20 Claims, No Drawings

AQUEOUS COMPOSITION COMPRISING PHOSPHORIC ACID AND BORIC ACID

FIELD OF THE INVENTION

The present disclosure is related to the field of liquid aqueous compositions comprising phosphoric acid.

BACKGROUND OF THE INVENTION

Plant nutrients can be divided into three main classes: primary or macronutrients, such as nitrogen (N), phosphorus (P) and potassium (K); secondary nutrients, such as calcium (Ca), magnesium (Mg), sulphur (S), and sodium (Na); and micronutrients, such as boron (B), copper (Cu), iron (Fe), manganese (Mn), molybdenum (Mo) and zinc (Zn). An adequate supply of these nutrients is required for healthy growth of plants and in modern agriculture, it is common practice to apply inorganic fertilizers to crops in order to improve yield and quality. Solid fertilizers such as prills or granules containing one or more of the primary nutrients (N, P and K) represent the most common type of fertilizer and are typically applied to the soil. However, liquid fertilizers are also available and are becoming increasingly important in many markets due to the benefits they offer the grower in terms of convenience, flexibility, accuracy of delivery, and ease of application. Liquid fertilisers containing primary, secondary and micronutrients, alone or in combination, are widely available and may be applied using a variety of methods such as spraying onto the soil, injection into the soil, banding, incorporation into the seedbed during drilling; in the irrigation water (via fertigation or hydroponics systems); by spray application onto the foliage of the crop (foliar application); or in seed treatment.

Phosphorus is one of the primary plant nutrients, hence phosphatic fertilizers (i.e. fertilizers containing phosphorus) represent a very important segment of the market. Typical phosphorus sources used in the production of solid granular fertilizer intended for application onto the soil include single superphosphate, triple superphosphate and dicalcium phosphate which are only partially soluble in water. For applications requiring the fertilizer to be fully dissolved, such as in fertigation, water soluble phosphate salts such as mono-ammonium phosphate (MAP), di-ammonium phosphate (DAP), mono-potassium phosphate (MKP) and di-potassium phosphate (DKP) are widely used, and liquid fertilizer products can be manufactured thereof.

It is desirable for liquid fertilizers to be as concentrated as possible in order to minimize transport and storage costs, reduce packaging waste, improve productivity, and facilitate modern methods of application and dosing.

Using the phosphate salts mentioned above as phosphorus source limits the maximum phosphorus content that is achievable due to limited solubility of the salts in water and relatively high crystallization temperatures. If other nutrients were to be added to the solution, these may further reduce the phosphorus content that is achievable.

Greater phosphorus content can be achieved using phosphoric acid as the P source. The concentration of typical commercially available phosphoric acid is 75 weight % which equates to a $P_2O_5$ content of 54 weight %. The freezing point of 75 weight % phosphoric acid is −20° C. so this represents a very highly concentrated P source in a stable liquid form.

Phosphoric acid is a strong tri-protic mineral acid, so aqueous solutions of phosphoric acid have a low pH, which may impact the solubility of other fertilizer components.

Boron is a micronutrient that is required by crops. It is found in plant cell walls and reproductive structures. So, it may be desirable to provide an aqueous solution comprising a high content of phosphorus and some boron. However, the most common boron sources used in agriculture, such as sodium borate, zinc borate, boron ethanolamine and boric acid, are not soluble and/or chemically stable in concentrated phosphoric acid solutions.

CN107827585A (Guiyang Kailin Chemical Fertilizer, 2018) discloses solid fertilizer compositions comprising 10 to 18 wt % of ammonium polyphosphate, 10 to 20 wt % of dipotassium phosphate, 2 to 4 wt % of boric acid, and 4 to 8 wt % of a polystyrene-maleic anhydride grafted methoxy polyethylene glycol copolymer as a dispersant.

CN106748256A (Henan Luoxiaowang Biological Tech, 2017) discloses solid fertilizer compositions comprising equal amounts of phosphoric acid and potassium hydroxide, boric acid, and ethylene glycol.

CN104446761A (Guangzhou Yixiang Agricultural Technology, 2015) discloses a method for preparing a fertilizer solution comprising the steps of dissolving micronutrients sources, such as boric acid, in water; and sequentially adding other nutrient sources, such as phosphoric acid, potassium oxide, and potassium phosphate, and finally organic co-solvents such as diethylene glycol monoethyl ether and diethylene glycol.

CN102311289B (Xianglin Wang, 2014) discloses a method wherein an aqueous solution comprising primary nutrients, such as potassium phosphate, and potassium tartrate, micronutrients and citric acid is mixed with a solution of potassium humate, boric acid and phosphoric acid in ethylene glycol. Further nutrients are added to the mixture, which is then concentrated.

CN105152810A (Guangxi Penshibao, 2015) discloses a solid fertilizer composition comprising 0.88 wt % of boric acid, 7 wt % of phosphoric acid and 2.7 wt % of ethylene glycol.

CN104892322A (Wang Xuexiang, 2015) discloses a solid fertilizer composition comprising 3.7 wt % of boric acid, 3.7 wt % of phosphoric acid and 11 wt % of ethylene glycol.

SUMMARY OF THE INVENTION

It was found out that boric acid could be dissolved in an organic solvent and then mixed with an aqueous solution of phosphoric acid to provide a stable, aqueous composition comprising phosphorus and boron. It was also found that the addition of an organic solvent in an aqueous solution of phosphoric acid increased the solubility and stability of boric acid in the aqueous solution.

In a first aspect, the present disclosure provides a method for preparing an aqueous composition, comprising the steps of:

a) dissolving boric acid in a solvent comprising a compound selected from the group consisting of glycerol, glycols, glycol derivatives, and any mixtures thereof; and b) mixing the solution obtained in step a) with an aqueous solution comprising from 1.0 to 50 wt % of phosphoric acid.

In another aspect, the present disclosure provides an aqueous composition comprising water, from 1.0 to 50 weight % of phosphoric acid, from 0.5 to 5.0 wt % of boric acid, and from 2.0 to 20 wt % of a compound selected from the group consisting of glycerol, glycols, glycol derivatives, and any mixtures thereof.

In another aspect, the present disclosure provides the liquid aqueous composition according to the present disclosure as a fertilizer, in particular for foliar application.

DETAILED DESCRIPTION OF THE INVENTION

Unless otherwise defined, all terms used in disclosing the invention, including technical and scientific terms, have the meaning as commonly understood by one of ordinary skill in the art to which this invention belongs. By means of further guidance, term definitions are included to better appreciate the teaching of the present invention.

All references cited in this description are hereby deemed to be incorporated in their entirety by way of reference.

As used herein, the following terms have the following meanings:

"A", "an", and "the" as used herein refers to both singular and plural referents unless the context clearly dictates otherwise. By way of example, "a compartment" refers to one or more than one compartment.

"About" as used herein referring to a measurable value such as a parameter, an amount, a temporal duration, and the like, is meant to encompass variations of +/−20% or less, in particular +/−10% or less, more in particular +/−5% or less, even more in particular +/−1% or less, and still more in particular +/−0.1% or less of and from the specified value, in so far such variations are appropriate to perform in the disclosed invention. However, it is to be understood that the value to which the modifier "about" refers is itself also specifically disclosed.

"Comprise", "comprising", and "comprises" and "comprised of" as used herein are synonymous with "include", "including", "includes" or "contain", "containing", "contains" and are inclusive or open-ended terms that specifies the presence of what follows e.g. component and do not exclude or preclude the presence of additional, non-recited components, features, element, members, steps, known in the art or disclosed therein.

The recitation of numerical ranges by endpoints includes all numbers and fractions subsumed within that range, as well as the recited endpoints.

The expression "weight percent", "% wt" or "weight %", here and throughout the description unless otherwise defined, refers to the relative weight of the respective component based on the overall weight of the formulation.

In a first aspect, the present disclosure provides a method for preparing an aqueous composition, comprising the steps of:

a) dissolving boric acid in a solvent comprising a compound selected from the group consisting of glycerol, glycols, glycol derivatives, and any mixtures thereof; and
b) mixing the solution obtained in step a) with an aqueous solution comprising from 1.0 to 50 wt % of phosphoric acid.

Boric acid is the chemical compound with the formula $H_3BO_3$, which may also be written $B(OH)_3$. Boron is a micronutrient that is required by crops, and boric acid was found to be absorbed by crops and is a good source of boron for agricultural use. It was found that boric acid was soluble in a range of organic solvents, and when such a solution was added to an aqueous solution comprising phosphoric acid, the boric acid stayed in solution, and did not precipitate.

The boric acid can be dissolved in a solvent comprising a compound selected from the group consisting of glycerol, glycols, glycol derivatives, and any mixtures thereof. The solvent may consist of a single compound, such as glycerol, or monoethylene glycol, but the solvent may also be a mixture of different compounds, such as a mixture of glycerol and monoethylene glycol. In addition to the compound selected from the group consisting of glycerol, glycols, glycol derivatives, and any mixtures thereof, the solvent in which the boric acid is dissolved may comprises other liquids and or compounds.

In one embodiment, boric acid is dissolved in the solvent as a 5 to 20 weight %, 7 to 20 weight %, or 10 to 20 weight % solution in the solvent comprising a compound selected from the group consisting of glycerol, glycols, glycol derivatives, and any mixtures thereof.

As used herein, the term "glycols" refer to the group of organic molecules comprising two hydroxyl groups (OH), wherein each hydroxyl group is connected to a carbon atom. The term "glycols" comprise 1,2-ethanediol, also named ethylene glycol, 1,2-propanediol, 1,3-propanediol, 1,2-butanediol, 1,3-butanediol, 1,4-butanediol, 1,2-pentanediol, 1,3-pentanediol, 1,4-pentanediol, 1,5-pentanediol; triols, such as 1,2,3-propanetriol, also named glycerol.

As used herein, the term "glycol derivatives" refer to the group of organic molecules comprising the compounds named above, where one of the hydroxy group has been substituted or modified. For example, the hydroxy group may have been tuned unto an ether, an ester, or a carbonate. Glycol derivatives also comprise polymers of the compounds cited above, such as diethylene glycol, triethylene glycol and any polyethylene glycol. Glycol derivatives also comprise derivatives of polymers mentioned above, such as mono ethers, and diethers of polyethylene glycol, such as monomethyl diethylene glycol, monoethyl diethylene glycol, monopropyl diethylene glycol, monobutyl diethylene glycol, dimethyl diethylene glycol, diethyl diethylene glycol, dipropyl diethylene glycol, dibutyl diethylene glycol.

In one embodiment, boric acid is dissolved in glycerol as a 10 weight % solution. This means that 1 part by weight of boric acid is added to 9 parts by weight of glycerol.

In one embodiment, boric acid is dissolved in a solvent consisting of glycerol, monoethylene glycol and mannitol in a 4:4:1 ratio, i.e. the solvent comprises 4 parts, by weight, of glycerol, 4 parts, by weight, of monoethylene glycol, and 1 part, by weight, of mannitol.

In one embodiment, boric acid is dissolved in a solvent consisting of glycerol, monoethylene glycol and mannitol in a 8:1:1 ratio, i.e. the solvent comprises 8 parts, by weight, of glycerol, 1 part, by weight, of monoethylene glycol, and 1 part, by weight, of mannitol.

In one embodiment, boric acid is dissolved in a solvent consisting of glycerol, monoethylene glycol and mannitol in a 8:1:1 ratio as a 17.5 weight % solution.

In one embodiment, the solvent used in step a) comprises a sugar or a sugar alcohol. As used herein, the term "sugar" refers to the group consisting of mono- and di-saccharides. Monosaccharides include glucose, fructose, and galactose. Disaccharides include sucrose, lactose and maltose. As used herein, the term "sugar alcohol" refers to the group of molecules also named polyhydric alcohols, or polyalcohols. A sugar alcohol is a molecule with the general formula $HOCH_2(CHOH)_nCH_2OH$, wherein n in an integer comprised between 1 and 22. Mannitol is a sugar alcohol with n=4.

In one embodiment, the dissolution of boric acid in the solvent comprising a compound selected from the group consisting of glycerol, glycols, glycol derivatives, and any mixtures thereof is performed at a temperature of from 50 to 70° C. It was found that the dissolution of boric acid in the organic solvent may be accelerated by heating up the solution. The solution is heated up only to accelerate the dissolution of the boric acid in the solvent, not to catalyse any reaction that may occur between the boric acid and the solvent.

In one embodiment, the step b) is performed such that the final aqueous composition obtained from step b) comprises 1.0 to 30 wt %, 5 to 30 wt %, 10 to 30 wt %, 10 to 20 wt %, 5 to 20 wt %, 0.5 to 4.5 wt %, 0.5 to 4.0 wt %, 0.5 to 3.5 wt %, 0.5 to 3.0 wt %, 1.0 to 4.5 wt %, 1.0 to 4.0 wt %, 1.0 to 3.5 wt %, 1.0 to 3.0 wt %, 1.5 to 4.5 wt %, 1.5 to 4.0 wt %, or 1.5 to 3.5 wt % of boric acid. The boric acid content of the final aqueous composition can vary from 0.5 to 30 weight % depending on the requirements.

In one embodiment, the aqueous composition obtained from step b) comprises 1.0 to 30 wt %, 5 to 30 wt %, 10 to 30 wt %, 10 to 20 wt %, 5 to 20 wt %, 0.5 to 4.5 wt %, 0.5 to 4.0 wt %, 0.5 to 3.5 wt %, 0.5 to 3.0 wt %, 1.0 to 4.5 wt %, 1.0 to 4.0 wt %, 1.0 to 3.5 wt %, 1.0 to 3.0 wt %, 1.5 to 4.5 wt %, 1.5 to 4.0 wt %, or 1.5 to 3.5 wt % of boric acid.

Once the boric acid is dissolved in the solvent, the boric acid solution is mixed with an aqueous solution comprising from 1.0 to 50 wt % of phosphoric acid.

As used herein, phosphoric acid refers to a composition selected from the group consisting of orthophosphoric acid, any oligophosphoric acid, any polyphosphoric acid, and any mixtures thereof. The generic term, phosphoric acid, refers to the group of compounds comprising one or more phosphorus atoms, wherein the one or more phosphorus atoms are in the oxidation state +5, and the one or more phosphorus atoms are bound to oxygen atoms. $H_3PO_4$, also named orthophosphoric acid, is the smallest molecules in this group. But orthophosphoric acid can react with itself to form polymers thereof, such as pyrophosphoric acid, $H_4P_2O_7$, and triphosphoric acid, $H_5P_3O_{10}$. The linear oligophosphoric acids and polyphosphoric acids have the general formula $H_{n+2}P_nO_{3n+1}$, where n is an integer. The oligophosphoric acids and polyphosphoric acids can also have m cycles in their structure, wherein m is an integer. The general formula of linear or cyclic oligophosphoric acids and polyphosphoric acids is $H_{n+2-2m}P_nO_{3n+1-m}$, where n and m are integers. Oligophosphoric acids refer to the polymers wherein n in equal or smaller than 10, polyphosphoric acids to the polymers wherein n is greater than 10.

The main solvent of the aqueous solution comprising phosphoric acid is water, but it may contain some co-solvents.

In one embodiment, the aqueous solution comprising phosphoric acid comprises from 5 to 50 wt %, from 10 to 50 wt %, from 15 to 50 wt %, from 20 to 50 wt %, from 25 to 50 wt %, from 30 to 50 wt %, 5 to 45 wt %, from 10 to 45 wt %, from 15 to 45 wt %, from 20 to 45 wt %, from 25 to 45 wt %, from 30 to 45 wt %, from 5 to 40 wt %, from 10 to 40 wt %, from 15 to 40 wt %, from 20 to 40 wt %, from 25 to 40 wt %, from 10 to 30 wt %, or from 20 to 30 wt % of phosphoric acid.

In one embodiment, the aqueous solution comprising phosphoric acid further comprises a phosphate salt, for example a dihydrogen phosphate salt, such as calcium dihydrogen phosphate, magnesium dihydrogen phosphate, ammonium dihydrogen phosphate, copper dihydrogen phosphate, manganese dihydrogen phosphate, iron dihydrogen phosphate and zinc dihydrogen phosphate. In one embodiment, the aqueous solution comprising phosphoric acid further comprises from 1.0 to 10 wt % of a phosphate salt, for example a dihydrogen phosphate salt. The aqueous solution may comprise a phosphate salt in addition to the phosphoric acid. The phosphate salt provides an additional source of phosphate, and the cation of the salt, which may be for example calcium, magnesium, zinc, copper, manganese, iron or ammonium, is also a nutrient, increasing the agronomical value of the final aqueous composition.

The phosphate salt comprised in the aqueous solution may be present in the aqueous solution due to the direct addition of the phosphate salt to the aqueous solution. Alternatively, the phosphate salt may be present due to the reaction of phosphoric acid with a basic component, such as a metal oxide, e.g. calcium oxide, magnesium oxide, or a metal hydroxide.

In one embodiment, the aqueous solution comprising phosphoric acid is prepared by adding concentrated phosphoric acid in water.

In one embodiment, the aqueous solution comprising phosphoric acid is prepared by adding phosphoric acid and one or more compounds selected from the group of a phosphate salt, a potassium salt, a metal oxide, a metal hydroxide, a metal carbonate, a metal acetate and any mixture thereof, in water.

If a basic metal compound, such as a metal oxide, a metal hydroxide, a metal carbonate, or a metal acetate, is mixed with phosphoric acid in water, an chemical reaction, in particular an exothermic chemical reaction, may occur between phosphoric acid and the basic metal component and yield a metal phosphate salt. The aqueous solution wherein the metal salt and phosphoric acid are added in, may be cooled with any suitable means, such as a water bath, to absorb the heat of the reaction. For example, adding magnesium oxide in an aqueous solution comprising an excess (in moles) of phosphoric acid yields magnesium dihydrogen phosphate.

In one embodiment, the aqueous solution comprising phosphoric acid contains one or more additional nutrients, in particular nutrients selected from the group consisting of nitrogen, potassium, calcium, magnesium, sulphur, sodium, copper, iron, manganese, molybdenum, and zinc.

In one embodiment, the aqueous solution comprising phosphoric acid comprises potassium and/or magnesium.

In one embodiment, the aqueous solution comprising phosphoric acid comprises potassium, magnesium and zinc.

In one embodiment, the aqueous solution comprising phosphoric acid comprises potassium, magnesium, zinc and calcium.

In one embodiment, the aqueous solution comprising phosphoric acid has a pH of from 0.5 to 2.0, from 0.8 to 1.7, or from 1.0 to 1.5.

In one embodiment, the aqueous solution comprising phosphoric acid comprises potassium, in particular from 1.0 to 10 wt %, more in particular from 2.0 to 9.0 wt %, even more in particular from 3.0 to 8.0 wt %, even more in particular from 4.0 to 7.0 weight %, of potassium, expressed as $K_2O$.

In one embodiment, the aqueous solution comprising phosphoric acid comprises magnesium, in particular from 0.1 to 10 wt %, from 1.0 to 9.0 wt %, from 2.0 to 8.0 wt %, from 2.0 to 7.0 weight %, from 1.0 to 6.0 weight %, from 2.0 to 6.0 weight %, from 1.0 to 5.0 weight %, or from 2.0 to 5.0 weight % of magnesium.

In one embodiment, the boric acid solution is mixed with the aqueous solution comprising phosphoric acid in a weight ratio of from 9:1 to 1:9, from 5:1 to 1:9, from 3:1 to 1:9, from 1:1 to 1:9, or from 1:1 to 1:5. A weight ratio of boric acid solution to aqueous solution comprising phosphoric acid of 1:9 means that 1 part by weight of the boric acid solution is mixed with 9 parts, by weight, of the aqueous solution comprising phosphoric acid.

In one embodiment, the aqueous composition obtained in step b) has a pH of from 0.5 to 2.0.

In one embodiment, the aqueous composition obtained in step b) comprising phosphoric acid comprises from 5 to 50 wt %, from 10 to 50 wt %, from 15 to 50 wt %, from 20 to 50 wt %, from 25 to 50 wt %, from 30 to 50 wt %, 5 to 45 wt %, from 10 to 45 wt %, from 15 to 45 wt %, from 20 to 45 wt %, from 25 to 45 wt %, from 30 to 45 wt %, from 5 to 40 wt %, from 10 to 40 wt %, from 15 to 40 wt %, from 20 to 40 wt %, from 25 to 40 wt %, from 10 to 30 wt %, or from 20 to 30 wt % of phosphoric acid.

In one embodiment, the aqueous composition obtained in step b) comprising phosphoric acid comprises potassium, in particular from 1.0 to 10 wt %, more in particular from 2.0 to 9.0 wt %, even more in particular from 3.0 to 8.0 wt %, even more in particular from 4.0 to 7.0 weight %, of potassium, expressed as $K_2O$.

In one embodiment, the aqueous composition obtained in step b) comprising phosphoric acid comprises magnesium, in particular from 0.1 to 10 wt %, from 1.0 to 9.0 wt %, from 2.0 to 8.0 wt %, from 2.0 to 7.0 weight %, from 1.0 to 6.0 weight %, from 2.0 to 6.0 weight %, from 1.0 to 5.0 weight %, or from 2.0 to 5.0 weight % of magnesium.

In another aspect, the present disclosure provides an aqueous composition comprising water, phosphoric acid, boric acid, and a compound selected from the group consisting of glycerol, glycols, glycol derivatives, and any mixtures thereof.

In one embodiment, the present disclosure provides an aqueous composition comprising water, from 1.0 to 50 weight % of phosphoric acid, from 0.5 to 5.0 wt % of boric acid, and from 2.0 to 20 wt % of a compound selected from the group consisting of glycerol, glycols, glycol derivatives, and any mixtures thereof.

In one embodiment, the boric acid is dissolved in the aqueous composition and does not precipitate out of the composition over a prolonged storage period.

The aqueous composition comprises phosphoric acid. As discussed above, phosphoric acid may refer to ortho-phosphoric acid or any polymeric form thereof.

In one embodiment, the aqueous composition comprises from 1.0 to 50 wt %, from 5.0 to 50 wt %, from 10 to 50 wt %, from 15 to 50 wt %, from 20 to 50 wt %, from 25 to 50 wt %, from 30 to 50 wt %, 5 to 45 wt %, from 10 to 45 wt %, from 15 to 45 wt %, from 20 to 45 wt %, from 25 to 45 wt %, from 30 to 45 wt %, 5 to 40 wt %, from 10 to 40 wt %, from 15 to 40 wt %, from 20 to 40 wt %, from 25 to 40 wt %, or from 30 to 40 wt % of phosphoric acid.

In one embodiment, the composition comprises orthophosphoric acid. Orthophosphoric acid is a well-known suitable phosphorus source for agriculture uses. It is widely available and well absorbed by plants.

In one embodiment, the aqueous composition comprises from 1.0 to 50 wt %, from 5.0 to 50 wt %, from 10 to 50 wt %, from 15 to 50 wt %, from 20 to 50 wt %, from 25 to 50 wt %, from 30 to 50 wt %, 5 to 45 wt %, from 10 to 45 wt %, from 15 to 45 wt %, from 20 to 45 wt %, from 25 to 45 wt %, from 30 to 45 wt %, 5 to 40 wt %, from 10 to 40 wt %, from 15 to 40 wt %, from 20 to 40 wt %, from 25 to 40 wt %, or from 20 to 30 wt % of orthophosphoric acid.

In one embodiment, the aqueous composition comprises 0.5 to 4.5 wt %, 0.5 to 4.0 wt %, 0.5 to 3.5 wt %, 0.5 to 3.0 wt %, 1.0 to 4.5 wt %, 1.0 to 4.0 wt %, 1.0 to 3.5 wt %, 1.0 to 3.0 wt %, 1.5 to 4.5 wt %, 1.5 to 4.0 wt %, or 1.5 to 3.5 wt % of boric acid.

The compound selected from the group consisting of glycerol, glycols, glycol derivatives, and any mixtures thereof, is used to stabilize the boric acid as discussed in the method according to the present invention. It increases the stability and/or solubility of the boric acid in the aqueous solution comprising phosphoric acid.

In one embodiment, the aqueous composition according to the present disclosure further comprises potassium, in particular from 1.0 to 10 wt %, more in particular from 2.0 to 9.0 wt %, even more in particular from 3.0 to 8.0 wt %, even more in particular from 4.0 to 7.0 weight %, of potassium, expressed as $K_2O$. Potassium is a primary nutrient required by most crops. Various sources of potassium suitable for agricultural use are well known in the field. Some of them are water-soluble and can be added to the present composition. Having multiple nutrients in a single solution is interesting because it facilitates the work of the farmer by reducing the number of actions he needs to take to provide all the required nutrients to its crops. It also reduces the water consumption of the farm.

In one embodiment, the aqueous composition comprises potassium chloride and/or a potassium phosphate. A potassium phosphate may be mono-potassium phosphate, or dipotassium phosphate. Potassium chloride, and potassium phosphates are well-known potassium sources suitable for agricultural use. In one embodiment, the aqueous composition comprises from 1.0 to 10 wt %, from 2.0 to 10 wt %, from 3.0 to 10 wt %, from 1.0 to 9.0 wt %, from 2.0 to 9.0 wt %, or from 3.0 to 9.0 wt % of potassium chloride. In one embodiment, the aqueous composition comprises from 1.0 to 10 wt %, from 2.0 to 10 wt %, from 3.0 to 10 wt %, from 1.0 to 9 wt %, from 2.0 to 9 wt %, or from 3.0 to 9 wt % of monopotassium phosphate.

In one embodiment, the aqueous composition comprises from 1.0 to 10 wt % of potassium chloride and from 1.0 to 10 wt % of monopotassium phosphate.

It is known, for example from GB2071075A (Hamerhill Int. Ltd., 1981), that alkaline metal compounds such as oxides, hydroxides, or acetates, may be added to aqueous solutions of phosphoric acid to obtain an aqueous solution containing metal phosphates salts. For example, calcium oxide may be added to an aqueous solution comprising phosphoric acid to yield calcium phosphate.

In one embodiment, the aqueous composition further comprises magnesium, in particular from 1.0 to 10 wt %, more in particular from 1.0 to 9.0 wt %, even more in particular from 1.0 to 8.0 wt %, even more in particular from 1.0 to 7.0 weight %, of magnesium. Magnesium is a secondary nutrient required by most crops. Various sources of magnesium suitable for agricultural use are well known in the field. Some of them are water-soluble and can be added to the present composition. In one embodiment, the aqueous composition comprises magnesium oxide.

In one embodiment, the aqueous composition comprises choline chloride. In one embodiment, the aqueous composition comprises from 0.01 to 10 wt % of choline chloride. It was observed that choline chloride stabilized the final aqueous composition, in particular it prevents precipitation of salts, such as boron-containing salts, upon prolonged storage.

In one embodiment, the aqueous composition comprises water, from 1.0 to 50 weight % of phosphoric acid, from 0.5 to 5.0 wt % of boric acid, from 2.0 to 20 wt % of a compound selected from the group consisting of glycerol, glycols, glycol derivatives, and any mixtures thereof, potassium and magnesium.

In one embodiment, the aqueous composition comprises water, from 1.0 to 50 weight % of phosphoric acid, from 0.5 to 5.0 wt % of boric acid, from 2.0 to 20 wt % of a compound selected from the group consisting of glycerol, glycols, glycol derivatives, and any mixtures thereof, from 1.0 to 10 wt % of potassium, as expressed in $K_2O$, and magnesium.

In one embodiment, the aqueous composition comprises water, from 1.0 to 50 weight % of phosphoric acid, from 0.5 to 5.0 wt % of boric acid, from 2.0 to 20 wt % of a compound selected from the group consisting of glycerol, glycols, glycol derivatives, and any mixtures thereof, from 1.0 to 10 wt % of potassium, as expressed in $K_2O$, and from 1.0 to 10 wt % of magnesium.

In one embodiment, the aqueous composition comprises water, from 1.0 to 50% weight of phosphoric acid, from 0.5 to 5 wt % of boric acid, from 2.0 to 20 wt % of a compound selected from the group of glycerol, glycol derivatives, and any mixtures thereof, from 1.0 to 10 wt % of potassium, as expressed as $K_2O$, from 1.0 to 5.0 wt % magnesium and from 1.0 to 5.0 wt % of zinc.

In one embodiment, the aqueous composition comprises water, from 1.0 to 50% weight of phosphoric acid, from 0.5 to 5.0 wt % of boric acid, from 2.0 to 20 wt % of a compound selected from the group of glycerol, glycol derivatives, and any mixtures thereof, from 1.0 to 10 wt % of potassium, as expressed as $K_2O$, from 1.0 to 5.0 wt % magnesium and from 0.1 to 1.0 wt % of zinc, and 0.1 to 1.0 wt % of calcium.

In one embodiment, the aqueous composition comprises from 1.0 to 20 weight %, from 2.0 to 20 weight %, or from 10 to 20 weight % of a compound selected from the group consisting of glycerol, glycols, glycol derivatives, and any mixtures thereof.

In one embodiment, the aqueous composition comprises from 2.0 to 20 wt % of glycerol. In one embodiment, the aqueous composition comprises from 2.0 to 20 wt % of a mixture of glycerol and monoethylene glycol. In one embodiment, the aqueous composition comprises from 2.0 to 20 wt % of a 1:1 mixture, by weight, of glycerol and monoethylene glycol.

In one embodiment, the aqueous composition comprises a sugar or a sugar alcohol, in particular mannitol, more in particular from 0.1 to 10 weight %, from 0.1 to 9.0 weight %, from 1.0 to 10 weight %, or from 2.0 to 10 weight % of mannitol. It was observed that a sugar or sugar alcohol, such as mannitol, stabilized the final aqueous composition, i.e. it prevented the precipitation of salts or other compounds during storage.

In one embodiment, the aqueous composition comprises from 5.0 to 45 wt %, from 10 to 45 wt %, from 15 to 45 wt %, from 20 to 45 wt %, from 20 to 40 wt %, from 20 to 35 wt %, or from 25 to 35 w % of phosphoric acid. It may be beneficial to have a very high concentration of phosphoric acid in the aqueous composition to provide as much phosphorus nutrient as possible to the plant in a single application. However, the content in phosphoric acid of the composition may be limited due to the solubility of phosphoric acid in water, and/or the solubility of the other components of the composition in presence of phosphoric acid.

In one embodiment, the aqueous composition comprises from 1.0 to 30 weight %, from 5 to 30 wt %, from 10 to 30 wt %, from 15 to 30 wt %, from 1.0 to 25 wt %, from 5.0 to 25 wt %, from 10 to 25 wt %, or from 15 to 25 wt % of phosphorus, expressed as $P_2O_5$. The content of phosphorus in the aqueous composition can also be expressed as the content of $P_2O_5$. The aqueous composition may comprise other sources of phosphorus than phosphoric acid, such as phosphate salts.

In one embodiment, the aqueous solution further comprises a phosphate salt, for example a dihydrogen phosphate salt, such as calcium dihydrogen phosphate, magnesium dihydrogen phosphate, ammonium dihydrogen phosphate and zinc dihydrogen phosphate, or a monohydrogen phosphate salt. In one embodiment, the aqueous solution comprising phosphoric acid further comprises from 1.0 to 10 wt %, from 2.0 to 10 wt %, from 3.0 to 10 wt %, from 4.0 to 10 wt %, from 1.0 to 9.0 wt %, from 2.0 to 9.0 wt %, from 3.0 to 9.0 wt %, from 4.0 to 9.0 wt %, from 1.0 to 8.0 wt %, from 2.0 to 8.0 wt %, from 3.0 to 8.0 wt %, or from 4.0 to 8.0 wt % of a phosphate salt, for example a dihydrogen phosphate salt.

In one embodiment, the aqueous composition comprises from 0.5 to 3.0 wt %, in particular from 1.0 to 3.0 wt %, of boric acid. A boric acid content from 0.5 to 3.0 wt % was found to be suitable for most crops.

In one embodiment, the weight ratio of boric acid to the compound selected from the group consisting of glycerol, glycols, glycol derivatives, and any mixtures thereof, is from 0.05 to 0.2. It was found that it was possible to dissolve the boric in concentrations from 5 to 20 weight %. It may be interesting to limit the amount of the compound to dissolve the boric acid, as it drives up the price of the final composition.

In one embodiment, the pH of the aqueous composition is from 0.5 to 2.0, from 0.8 to 1.7, or from 1.0 to 1.5.

Due to the presence of phosphoric acid, the pH of the aqueous solution may be very low. However, it was found out that the aqueous composition did not damage crops when sprayed onto them.

The aqueous composition provides fully dissolved phosphorus and boron to crops without damaging them.

The aqueous composition according to the present invention may be prepared by the method according to the present invention and disclosed above.

Alternatively, the aqueous composition according to the present invention may be prepared by another method comprising the steps of: a1) adding phosphoric acid to an aqueous solution; thereby obtaining an aqueous solution comprising 1.0 to 50 weight % of phosphoric acid; b1) optionally, adding to the aqueous solution provided in step a1) a phosphate salt and/or a potassium salt and/or a metal oxide, such as calcium oxide, magnesium oxide, or zinc oxide; c1) adding a solvent comprising a compound selected from the group consisting of glycerol, glycols, glycol derivatives, and any mixtures thereof, and optionally a sugar, a sugar alcohol, in particular mannitol, and/or choline chloride; d1) adding boric acid to the solution obtained in step c1).

It was found that it was possible to obtain an aqueous composition comprising phosphoric acid and boric acid by first mixing the phosphoric acid with water, then adding the organic solvent, i.e. the compound selected from the group consisting of glycerol, glycols, glycol derivatives, and any mixtures thereof, and then the boric acid. It is hypothesized that the glycerol or glycol compound stabilizes the boric acid in the aqueous solution, possibly by having some weak interactions with the boric acid. The other nutrients that may be comprised in the final aqueous composition, as described above, may be added in the solution comprising the phosphoric acid, before the glycerol or glycol compound is added to the solution.

Alternatively, the phosphate salt and/or a potassium salt and/or a metal oxide, such as calcium oxide, magnesium oxide, or zinc oxide, may be added to the aqueous solution before the addition of phosphoric acid.

In another aspect, the present disclosure provides the aqueous composition according to the present disclosure as a fertilizer, in particular for foliar application. The aqueous composition according to the present disclosure is suitable for use as a fertilizer since it comprises two nutrients, phosphorus and boron, required by crops. It was also found that the aqueous composition could be applied by foliar application, i.e. by spraying onto the crops. The aqueous composition is preferably diluted with water, for example 1 to 5 L of aqueous solution is diluted with 200 L of water. Alternatively, the solution can be used in fertigation, i.e. where the solution is distributed with the irrigation system. Alternatively, the aqueous composition may be applied directly to the soil.

The examples presented below illustrate the present invention, but do not intend to restrict the scope of the claims.

Example 1: To 334 g of water were successively added 33.3 g of monopotassium phosphate (99% pure), 66.0 g of potassium chloride (technical grade, 99% pure), 544 g of orthophosphoric acid (75% pure) and 73 g of magnesium oxide (99% pure). The mixture was stirred for 30 minutes until the reaction subsides. 258 g of glycerol (technical grade, 99% pure), and 82 g of mannitol (98% pure) were added and stirred until dissolved. 28.6 g of boric acid (99% pure) was added and the mixture was stirred for 60 min at 20° C. All the components were completely dissolved in the water. No precipitation was observed.

The final aqueous composition had the following properties:

| | |
|---|---|
| Density | 1.418 kg/L @ 20° C. |
| pH | 1.3 |
| Nutrient content (as wt. %) | $P_2O_5$ 22.0,<br>$K_2O$ 3.7,<br>B 0.4,<br>MgO 4.8. |

Example 2

To 358 g of water were successively added 78 g of magnesium oxide (99% pure), 36 g of monopotassium phosphate (99% pure), 71 g of potassium chloride (technical grade, 99% pure), 583 g of orthophosphoric acid (75% pure). The mixture was stirred for 30 minutes until the reaction subsides. 211 g of glycerol (technical grade, 99% pure), and 86 g of monoethylene glycol (99% pure) were added. The mixture was stirred until homogenous. 28.6 g of boric acid (99% pure) was added and the mixture was stirred for 60 min at 20° C. All the components were completely dissolved in the water. No precipitation was observed.

The final aqueous composition had the following properties:

| | |
|---|---|
| Density | 1.451 kg/L |
| pH | 1.3 |
| Nutrient (wt %): | $P_2O_5$ 23.1,<br>$K_2O$ 3.9,<br>B 0.3,<br>MgO 5.0. |

Example 3

To 354 g of water were successively added 77 g of magnesium oxide (99% pure), 35 g of monopotassium phosphate (99% pure), 70 g of potassium chloride (technical grade, 99% pure), 575 g of orthophosphoric acid (75% pure). The mixture was stirred for 30 minutes until the reaction subsides. 62 g of glycerol (technical grade, 99% pure), 84 g of monoethylene glycol (99% pure), and 119 g of a 75 weight % aqueous solution of choline chloride were added. The mixture was stirred until homogenous. 29.5 g of boric acid (99% pure) was added and the mixture was stirred for 60 min at 20° C. All the components were completely dissolved in the water. No precipitation was observed.

The final aqueous composition had the following properties:

| | |
|---|---|
| Density | 1.405 kg/L @20° C. |
| pH | 1.5 |
| Nutrient content (% wt) | $P_2O_5$ 23.5,<br>$K_2O$ 3.9,<br>B 0.4,<br>MgO 5.1. |

Example 4

To 354 g of water were successively added 53 g of magnesium oxide (99% pure), 36 g of monopotassium phosphate (99% pure), 71 g of potassium chloride (technical grade, 99% pure), 590 g of orthophosphoric acid (75% pure) and 44 g of zinc oxide (99% pure). The mixture was stirred for 30 minutes until the reaction subsides. 227 g of glycerol (technical grade, 99% pure), and 42 g of mannitol (98% pure) were added. The mixture was stirred until homogenous. 28.6 g of boric acid (99% pure) was added and the mixture was stirred for 60 min at 20° C. All the components were completely dissolved in the water. No precipitation was observed.

The final aqueous composition had the following properties:

| | |
|---|---|
| Density | 1.445 kg/L @ 20° C. |
| pH | 1.5 |
| Nutrient content (wt %) | $P_2O_5$ 23.4,<br>$K_2O$ 4.0,<br>B 0.3,<br>MgO 3.5,<br>Zn 2.4 |

Example 5

Another aqueous composition according to the present disclosure was prepared by the following procedure: 100 g of boric acid (99% pure) was added to a mixture of 700 g of glycerol (technical grade, 99% pure), and 100 g of mannitol (98% pure). The mixture was stirred for 45 min at a temperature of from 55 to 90° C. An aqueous solution was prepared was mixing 71 g of potassium chloride (technical grade, 99% pure), 36 g of monopotassium phosphate (99% pure), 587 g of orthophosphoric acid (75% pure), 79 g of magnesium oxide (99% pure) in 361 g of water. All the salts were completely dissolved in the water. 285 g of the boric acid solution in glycerol/mannitol was added to the aqueous solution, and stirred at room temperature to homogenize. No precipitation was observed.

The final aqueous composition had the following properties:

| | |
|---|---|
| Density | 1.419 kg/L @ 20° C. |
| pH | 1.3 |
| Nutrient content (% wt) | $P_2O_5$ 23.8,<br>$K_2O$ 4.0,<br>B 0.3,<br>MgO 5.2 |

The invention claimed is:

1. A method for preparing an aqueous solution, comprising steps of:

a) dissolving boric acid in a solvent comprising a compound selected from a group consisting of glycerol, glycols, glycol derivatives, and any mixtures thereof, to obtain a boric acid solution; and b) mixing the boric acid solution obtained in step a) with a solution comprising water and from 15 to 50 weight % of phosphoric acid to form the aqueous solution, wherein the aqueous solution has a pH from 0.5 to 2.0.

2. The method according to claim 1, wherein the solvent used in step a) comprises a sugar, a sugar alcohol, or choline chloride.

3. The method according to claim 2, wherein the sugar alcohol is mannitol.

4. The method according to claim 1, wherein the aqueous solution comprising from 15 to 50 weight % of phosphoric acid further comprises a phosphate salt.

5. The method according to claim 1, wherein the solution comprising water and from 15 to 50 weight % of phosphoric acid mixed in step b) has a pH of from 0.5 to 2.0.

6. An aqueous solution comprising water, from 15 to 50 weight % of phosphoric acid, from 0.5 to 5.0 wt % of boric acid, and from 2.0 to 20 wt % of a solvent selected from a group consisting of glycerol, glycols, glycol derivatives, and any mixtures thereof, wherein the aqueous solution has a pH from 0.5 to 2.0.

7. The aqueous solution according to claim 6, further comprising potassium, expressed as $K_2O$.

8. The aqueous solution according to claim 7, wherein the potassium is present in an amount from 1.0 to 10 wt %, expressed as $K_2O$.

9. The aqueous solution according to claim 6, further comprising magnesium.

10. The aqueous solution according to claim 9, wherein the magnesium is present in an amount from 1.0 to 10 wt %.

11. The aqueous solution according to claim 6, wherein the aqueous solution comprises from 2.0 to 25 wt % of the solvent selected from the group consisting of glycerol, glycols, glycol derivatives, and any mixtures thereof.

12. The aqueous solution according to claim 11 wherein the solvent is glycerol or a mixture comprising glycerol and monoethylene glycol.

13. The aqueous solution according to claim 6, wherein the aqueous solution comprises from 15 to 45 wt % of phosphoric acid.

14. The aqueous solution according to claim 13, wherein the phosphoric acid is present in an amount from 10-20 to 45 wt %.

15. The aqueous solution according to claim 6, wherein the aqueous solution comprises from 0.5 to 5.0 wt % of boric acid.

16. The aqueous solution according to claim 13, wherein the boric acid is present in an amount from 1.0 to 5.0 wt %.

17. The aqueous solution according to claim 6, further comprising a sugar or a sugar alcohol.

18. The aqueous solution according to claim 6, wherein the aqueous solution comprises from 15 to 30 weight %, of phosphorus, expressed as $P_2O_5$.

19. The aqueous solution according to claim 6, wherein a weight ratio of boric acid to the solvent selected from the group consisting of glycerol, glycols, glycol derivatives, and any mixtures thereof, is from 0.05 to 0.2.

20. A method comprising applying the aqueous solution according to claim 6 as a fertilizer in a foliar application.

* * * * *